Figure 1:
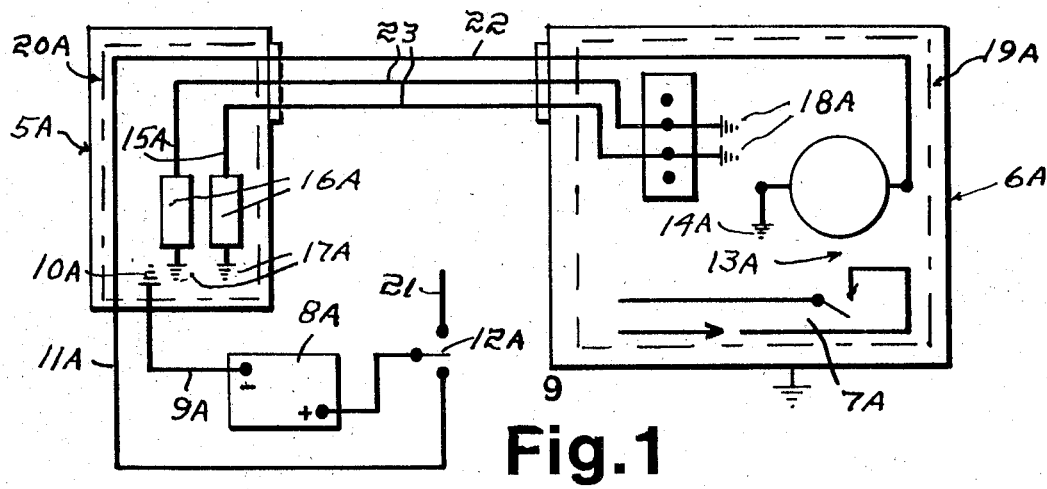

United States Patent

[11] 3,581,153

| [72] | Inventor | John Joyce |
| | | 179 Thacher St., Milton, Mass. 02187 |
| [21] | Appl. No. | 814,344 |
| [22] | Filed | Apr. 8, 1969 |
| [45] | Patented | May 25, 1971 |

[54] CONTROL CIRCUITRY TO PREVENT USE OF A SECONDARY CIRCUIT WITHOUT STATIC ELECTRICITY GROUNDS
7 Claims, 3 Drawing Figs.

[52] U.S. Cl. ............................................. 317/18,
307/9, 307/94, 340/255, 324/51
[51] Int. Cl. ............................................. H02h 1/02
[50] Field of Search ............................................. 307/9, 94,
125; 317/18 (B), 18 (C), 2; 340/255; 324/51;
220/88

[56] References Cited
UNITED STATES PATENTS
2,554,598  5/1951  Storch ........................... 317/18B
2,941,186  6/1960  Gelli ........................... 340/251X
3,320,480  5/1967  Failor ........................... 307/125X
FOREIGN PATENTS
636,088  4/1950  England ........................... 317/18B

*Primary Examiner*—Robert K. Schaefer
*Assistant Examiner*—William J. Smith
*Attorney*—Abbott Spear ABSTRACT: Control circuits are disclosed to prevent the use of a secondary circuit, each control circuit including first and second grids with the control circuit including a relay in control of the secondary circuit and having a grounded connection with the second grid and parallel leads each including a resistor and having a grounded connection with both grids, the resistors being operative to prevent the closing of the secondary circuit unless all the grounds of the parallel leads are effective.

INVENTOR.
John Joyce
BY
Attorney

CONTROL CIRCUITRY TO PREVENT USE OF A SECONDARY CIRCUIT WITHOUT STATIC ELECTRICITY GROUNDS

The present invention relates to control circuitry to prevent the operation of a secondary circuit unless effective grounds exist to eliminate static discharge.

It is, of course, well known that many industrial operations result in the generation of static electricity charges. In many of these operations, static electric charges are a nuisance while in others, notably in the handling of gasoline and other fuels, the discharge of static electricity is dangerous. While suitable grounds eliminate this hazard and are easily effected, precautions are often overlooked and established grounds may fail.

The general objective of the invention is to provide a control circuit that will prevent the operation of a secondary circuit including a fuel pump or other electrically operated devices when operation would either result in the generation of static electric charges or that would be unsafe unless effective grounds existed. In accordance with the invention, this objective is attained by providing a control circuit having a power source with a ground wire secured to a first grid and a lead including a normally open relay and grounded to a second grid insulated from the first grid. The secondary circuit includes the switch of the relay and an electrically operated element, desirably in the order named. Each of a pair of parallel leads includes a resistor and is grounded to both grids, the ground wires connected to each grid being separate from any ground wire connected thereto, and the resistors preventing the energization of the relay unless all the grounds of both parallel leads are effective.

In the accompanying drawings, there are shown embodiments of the invention illustrative of these and other of its objectives, novel features, and advantages.

Figure 2:
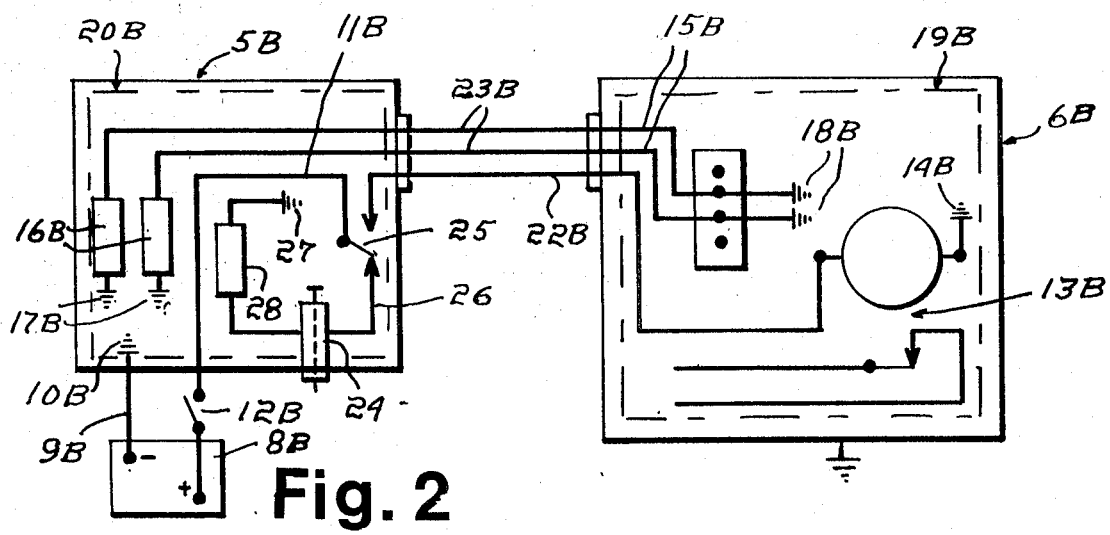
Figure 3:
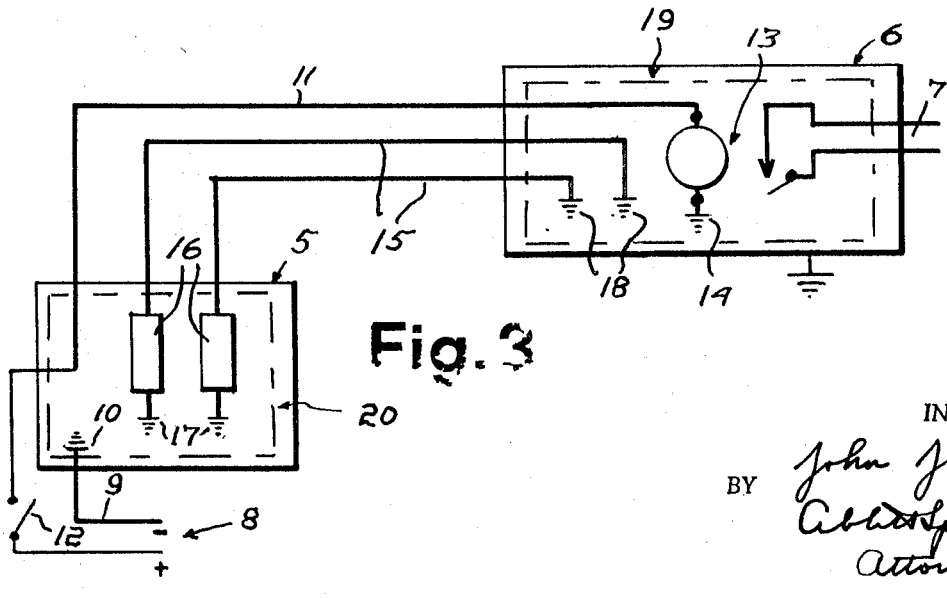

In the drawings:

FIG. 1 is a schematic view of control circuitry for use with a vehicle having a gasoline engine, FIG. 2 is a like view of control circuitry for use with a vehicle having a diesel engine, and FIG. 3 is a like view of control circuitry for more general use.

The embodiment of the invention illustrated by FIG. 3 is first detailed as it is for general uses with the control circuit including grids generally indicated at 5 and 6 and electrically insulated from each other. The circuit to be controlled, sometimes referred to as the secondary circuit, is indicated at 7 and includes an electric motor or other electrically operated device the use of which is to be permitted only if safeguards against the hazards of static electricity are in effect.

The power source of the control circuit is shown as a storage battery 8 having a ground wire 9 secured to the grid 5 by a ground 10 and a lead 11 including a switch 12 and a normally open relay 13 in control of the circuit 7 and next to its ground 14 secured to the grid 6. Each of a pair of parallel leads 15 includes a resistor 16 and a ground 17 secured to the grid 5 and a ground 18 secured to the grid 6.

As an example of the relationship between the battery 8, the relay 13, and the resistor 16, the battery 8 may be assumed to be a 12 volt battery and the relay 12 to be for 6 volt, 6 ohm operation having 1.0 ampere working, 0.8 ampere pickup, and 0.7 ampere drop away characteristics. The resistors 16 are 12 ohm, 1.0 ampere resistors. With the above illustrative combinations, operation is normally attended by a 6 volt drop across the resistors 16 in multiple and a 6 volt drop across the relay 13 with 1 ampere current. Since an effective static electricity ground exists between grids 5 and 6, the relay 13 closes the lead 7 placing its electrically operated device or devices in service. If either of the grounds of either lead 15 should fail, a 12 ohm resistor 16 would then be in series with a 6 ohm relay 13 and the resulting circuit would be 0.6 amperes. As the relay drops out at 0.7 amperes, the circuit 7 would open even though the other lead 15 still afforded an effective static electricity ground and this would be true if any other ground or lead became open.

Desirably all the grounds are welded and separate and the control circuit rendered tamperproof. The relay 13 and the grounds secured to the grid 6 are indicated as being within a tamperproof box 19 and the resistors and grounds secured to the grid 5 are indicated as being within a tamperproof box 20.

The embodiment of the invention illustrated by FIG. 1 is particularly adapted for use where gasoline or other fuel is being pumped, for example from a storage tank to the tank of a delivery vehicle powered by a gasoline engine. The control circuit of FIG. 1 is generally similar to that of FIG. 3 and, accordingly, it will not be again detailed and corresponding components will be distinguished by the suffix addition "A" to the appropriate reference numeral.

In this embodiment, the secondary circuit 7A includes the motor of the fuel pump, not shown, and the switch 12A also controls the ignition circuit 21 thus ensuring that the delivery pump cannot be operated with the engine of the vehicle running. The other difference between the embodiments of FIGS. 1 and 3 is that the lead 11A and the parallel leads 15A including detachable sections 22 and 23, respectively, which may be combined in a single cable.

The embodiment of the invention illustrated by FIG. 2 is particularly adapted for use when the vehicle to which fuel is being pumped is diesel powered and is generally similar to the previously discussed embodiments of the invention with like components distinguished by the suffix addition "B" to the appropriate reference numerals. Diesel engines are conventionally stopped by energizing a solenoid in control of an air line actuating a lever shutting off the delivery of fuel to the injectors. As this mechanism is conventional it is not shown except for the solenoid 24. The lead 11B has a switch 25 which when open with respect to the relay 13B is closed with respect to a lead 26 including the solenoid 24 which, in accordance with the invention is operative, when deenergized to hold the air line valve closed. The lead 26 is connected to grid 5B by a ground 27 and includes a resistor 28 when the solenoid 24 is rated for the same voltage as the relay 13B.

From the foregoing, it will be apparent that safeguards against the hazards of discharge of static electricity are provided that are adapted to meet a wide range of requirements whether the vehicles are boats, aircraft, or those travelling on the ground or tracks.

I claim:

1. A control circuit to regulate a secondary circuit, said control circuit comprising a power source including a ground wire, a first grid to which said ground wire is connected and a lead including a switch, a normally open relay and a ground wire, and a second grid insulated from the first grid to which said last-named ground wire is attached, and secondary circuit including the switch of said relay, and a pair of parallel leads each including a resistor and two parallel ground wires, one ground wire of each lead connected to the first grid and the other ground wire of each lead connected to the second grid.

2. The control circuit of claim 1 in which the ground wires connected to each grid are separate from any ground wire connected thereto.

3. The control circuit of claim 1 in which the leads from the power source to the relay all include separable connections.

4. The control circuit of claim 3 in which the first grid is a part of a motor powered vehicle and the lead that includes the relay includes the ignition switch in a position thereof other than that completing the ignition circuit.

5. The control circuit of claim 1 in which the front grid is part of a motor powered vehicle and the resistors are on the vehicle.

6. The control of claim 1 in which all the ground wires have a welded connection with the appropriate grids.

7. The control circuit of claim 3 in which the first grid is part of a diesel powered vehicle and the lead to the relay also includes a switch and a lead therefrom includes a solenoid and a resistor and a ground connected to the first grid, the last-named switch connecting the relay lead and the solenoid lead in the alternative.